Aug. 9, 1932. W. W. CARSON, JR 1,870,895
REGULATOR
Filed Oct. 29, 1928  4 Sheets-Sheet 1
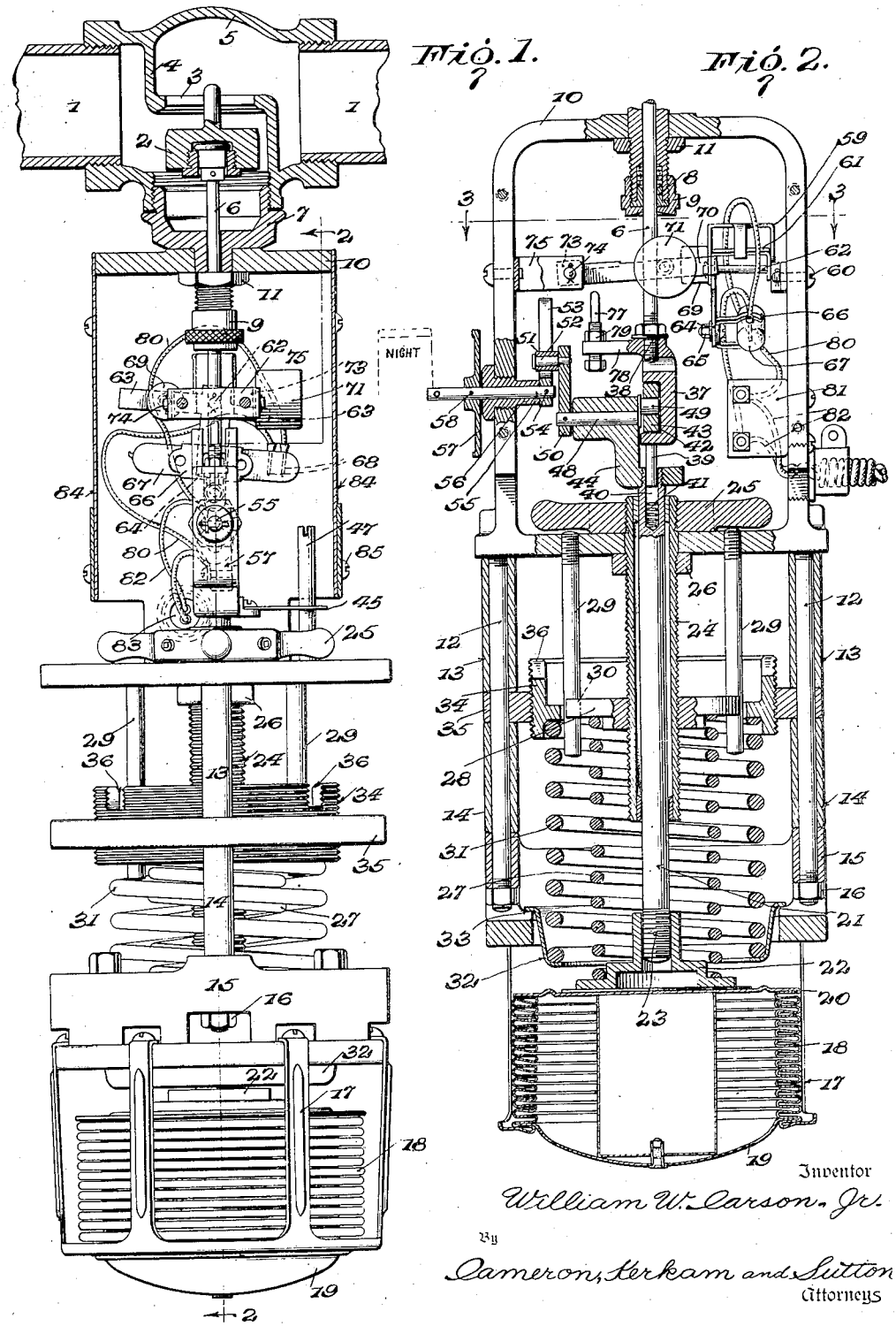
Inventor
William W. Carson, Jr.
By Cameron, Kerkam and Sutton
Attorneys

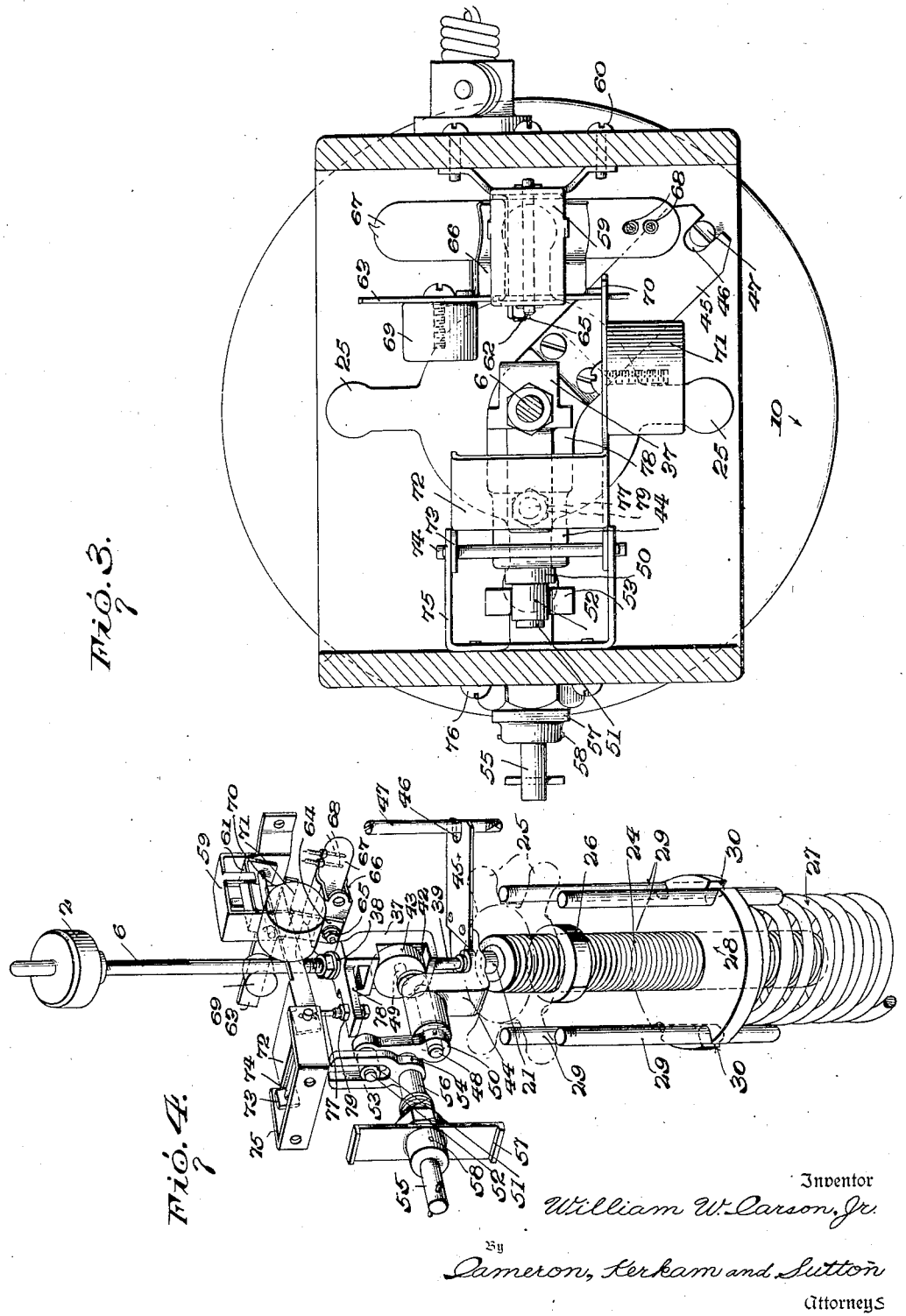

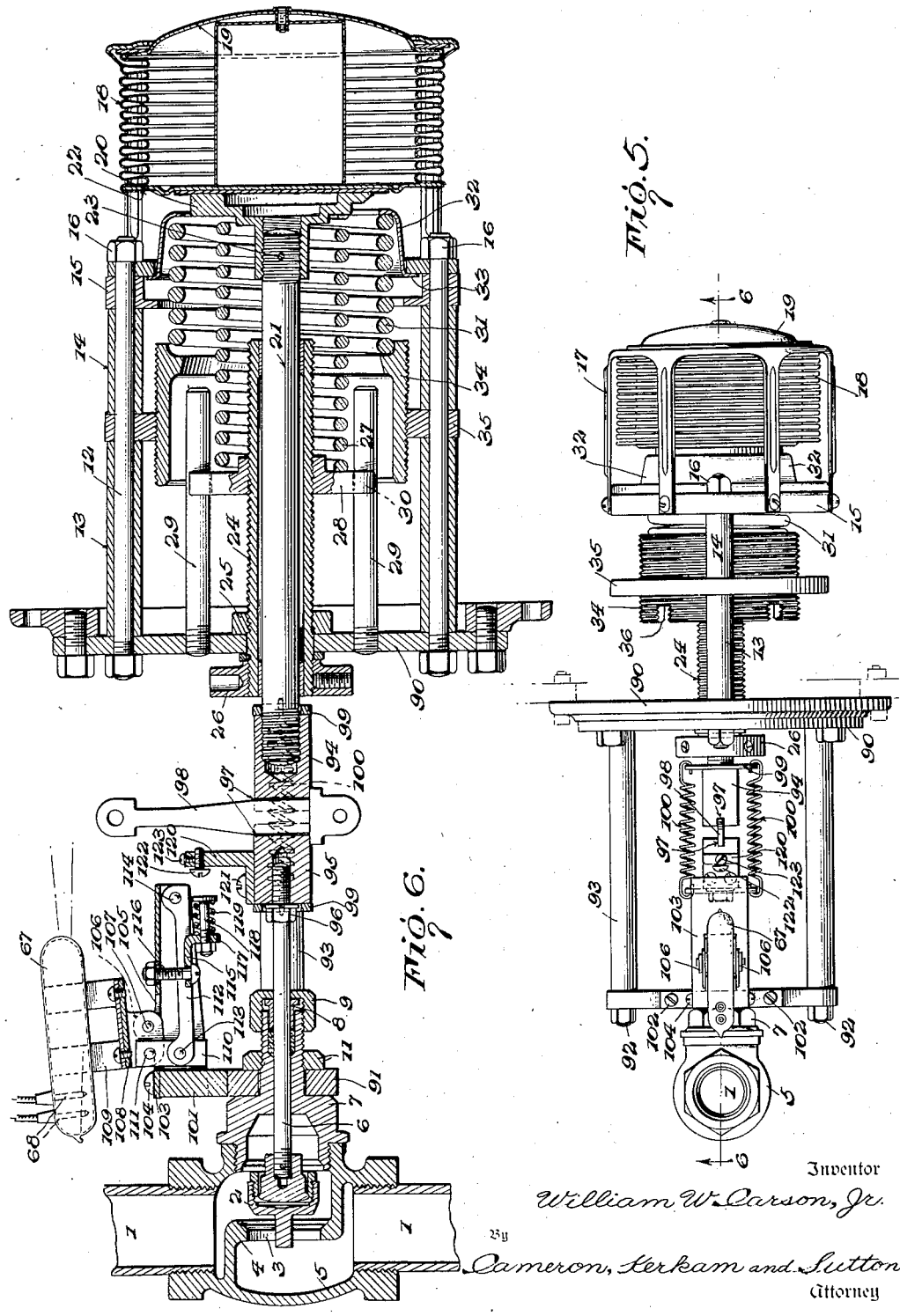

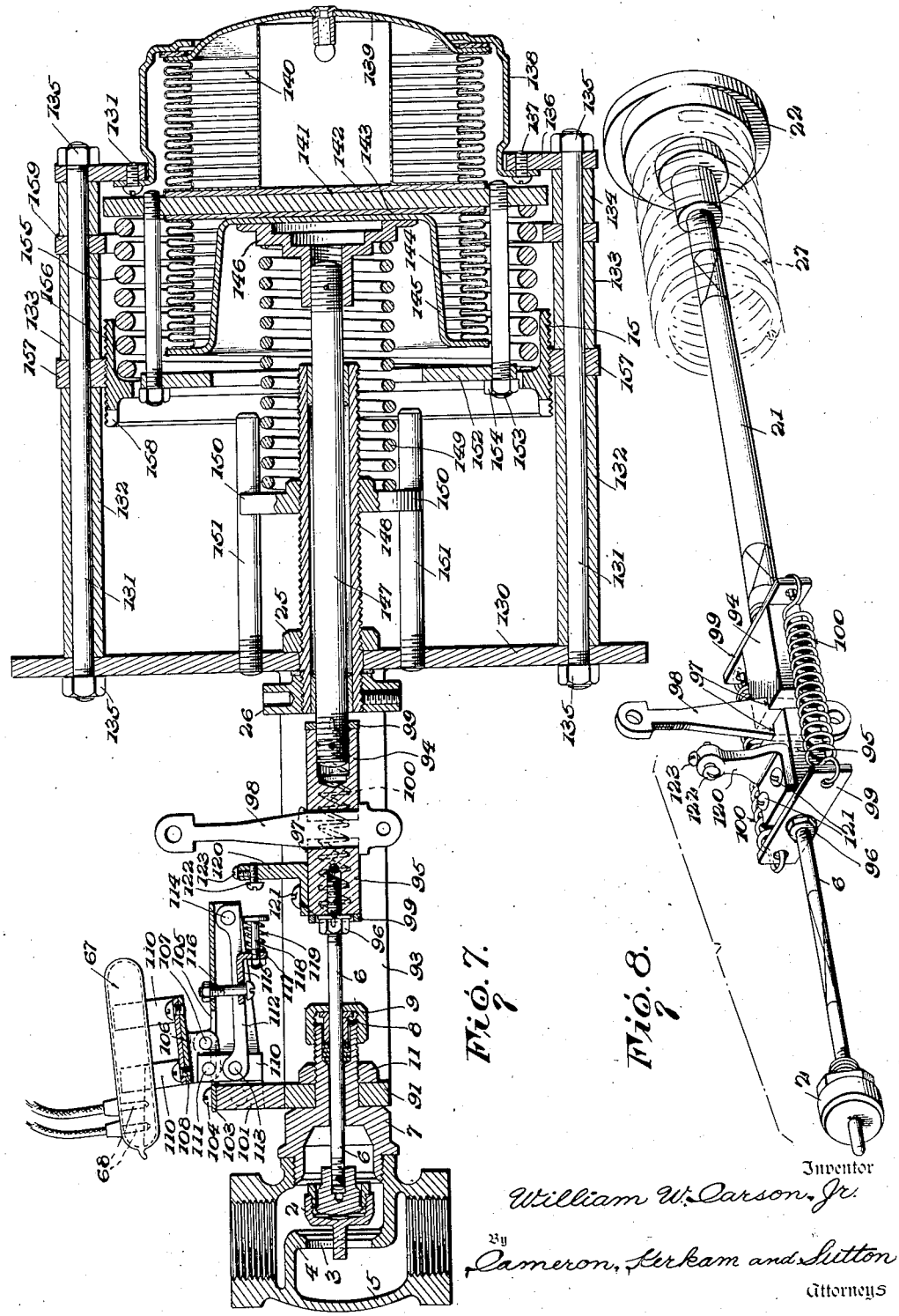

Patented Aug. 9, 1932

1,870,895

UNITED STATES PATENT OFFICE

WILLIAM W. CARSON, JR., OF KNOXVILLE, TENNESSEE, ASSIGNOR TO THE FULTON SYLPHON COMPANY, OF KNOXVILLE, TENNESSEE, A CORPORATION OF DELAWARE

REGULATOR

Application filed October 29, 1928. Serial No. 315,760.

This invention relates to means for controlling the actuation of a member in response to variations of temperature or pressure.

Many devices have heretofore been devised whereby a member such as a valve, switch, etc., may be caused to follow a predetermined sequence of positions in accordance with variations in pressure or temperature. In general, a flexible diaphragm, or a vessel of the well known bellows type, is employed to cause the desired movement in response to temperature or pressure variations, and this movement is controlled by an opposing force, usually resilient, which acts on the prime mover in opposition to the action of the temperature or pressure variation. A general disadvantage of such devices as heretofore known, however, is that while they are capable of factory or installation adjustments by engineers or experts, when once adjusted for a particular condition and installed for use they retain that adjustment without alteration and hence cannot be employed readily for any service other than under the particular conditions for which they have been adjusted. It is often the case, however, that such an apparatus should fulfill two services. For example, heating plants should maintain an evenly regulated temperature during the day, say 70° F., and an evenly regulated but less temperature during the night, say 60° F. The ordinary thermostatic control, installed and adjusted for 70° F., would maintain 70° F. throughout both day and night. To alter the adjustment from 70° to 60° F. each night is impracticable with known devices, because it requires considerable time, labor, etc., and because generally the services of an expert are required. The same is obviously true of many other applications of temperature or pressure responsive regulators.

One of the objects of the present invention is to provide a temperature or pressure responsive regulator which may be readily set while in use to operate under any one of a number of temperature or pressure conditions.

Another object is to provide novel means whereby a temperature controlled device or a pressure controlled device may be readily and selectively set while installed and in use use to maintain any one of a number of given temperatures or pressures.

A further object is to provide means whereby a member controlled by a temperature or pressure responsive element may be set selectively to occupy any one of a number of given positions for the same given condition of temperature or pressure.

A still further object is to provide means whereby a member controlled by a temperature or pressure responsive element may be selectively set to follow any one of a number of sequences of positions or ranges of movement for a given range of variation of temperature or pressure.

Other objects will appear more fully hereinafter as the description of the invention proceeds.

With the above objects in view, the invention, broadly stated, comprises the combination with any usual temperature or pressure responsive element and member controlled thereby, of means for readily setting the device whereby said member may occupy a plurality of different positions for any given position of said element. Stated another way, for any given movement of said element between two values of temperature or pressure, said member may be caused to pass through any desired one of a number of sequences of positions. Preferably, the adjusting means above referred to are embodied in the motion transmission system between the temperature or pressure responsive element and the member to be controlled thereby and may comprise, for example, any suitable means whereby said transmission system may be lengthened, shortened, or otherwise altered and said members thereby caused to occupy different positions for a given position of said element. Preferably, also, these means are of such character as to be selectively and easily operated, by any person however unskilled, while the apparatus is installed and in operation. In many instances the resilient force controlling the movement of the temperature or pressure responsive element will require alteration under these different conditions, and to this end supplementary resilient forces, supplied for example by additional springs, may be adapted to be brought into action by the operation of the above described means.

A better understanding of the invention may be obtained from certain concrete examples of its use hereinafter set forth. It is obvious that the invention is applicable to almost any type of thermostatic or pressure control, where more than one service condition is encountered, such as temperature or pressure responsive valve control, electric switch control, damper regulation, and many others. For purposes of exemplification, however, a thermostatically controlled house heating system has been selected, which is designed to maintain different constant temperatures during the day and during the night, and several embodiments of a thermostatic regulator designed for such a system have been illustrated in the accompanying drawings and described hereinafter; but it is to be expressly understood that these drawings are for purposes of illustration only and are not to be construed as a definition of the limits of the invention, reference being had to the appended claims for this purpose.

In said drawings,—

Fig. 1 is an elevation, partly in section, of such a regulator;

Fig. 2 is a section on the line 2—2 of Fig. 1;

Fig. 3 is a section, on an enlarged scale, on the line 3—3 of Fig. 2;

Fig. 4 is a perspective view showing a part of the mechanism of the regulator of Fig. 1;

Fig. 5 is an elevation of another regulator embodying the invention;

Fig. 6 is a section on the line 6—6 of Fig. 5, drawn to an enlarged scale;

Fig. 7 is a longitudinal sectional view of a further form of the invention; and

Fig. 8 is a perspective view showing parts of the mechanism of the regulators of Figs. 5 and 7.

In the embodiment shown in Figs. 1 to 4, inclusive, a fuel control valve for a gas burner or the like is operated by a thermostat of the well known bellows type, comprising a corrugated vessel partially filled with a volatile liquid and operatively connected to the valve stem, so that when the temperature around the vessel increases, the vapor pressure therein increases and the vessel expands against a suitable resilient force such as a spring and moves the valve towards closed position to reduce or cut off the flow of fuel, and vice versa. Thus an approximately constant temperature is normally maintained, which as is well known may be set at a desired value by adjusting the spring tension, and the valve occupies an approximately constant position so that the flow of fuel is just sufficient to maintain the desired temperatures. The above adjustment of spring tension is an installation adjustment and once made is constant; that is, it can not be altered to provide for a different temperature without a great deal of time and trouble, and without extensive and accurate tests requiring the services of an expert.

The present invention provides a means for altering the position of the valve for this approximately constant position of the thermostat, so as to allow either a greater or lesser flow of fuel, thus causing an increase or decrease in temperature and a consequent readjustment of the thermostat and valve to maintain a new temperature. In the embodiment to be described, it is preferable to accomplish this by providing suitable adjustable means for varying the length of the valve stem. Thus if the valve stem be shortened, the valve is opened further, more fuel flows, the temperature increases, and the thermostat expands against an increasing spring tension to partially close the valve until a new condition of equilibrium is obtained at a higher temperature than before. In case the total movement of the thermostat with relation to the length of the spring is so short that there is not sufficient increase in spring tension, or for any other reason, an additional spring may be provided which comes into action only when the thermostat moves past the position of first equilibrium toward the second, and this second spring may likewise be adjusted on installation so as to fix the point of the second equilibrium.

Referring now to Figs. 1 to 4, inclusive, wherein like reference numerals indicate like parts throughout the several views, a suitable heating unit such as a gas burner for house heating, for example, may receive fuel through the pipe 1, provided with a control valve of any suitable type. For reasons hereinafter indicated, a piston valve 2 is preferably employed for this purpose, said valve being movable through an opening 3 provided in a partition 4 extending across the valve casing 5. A valve stem 6, secured to the valve 2 in any suitable way, passes through and is guided by a valve bonnet 7, the escape of gas past the valve stem being prevented by suitable means such as packing held in place by gland 8 and nut 9.

The thermostat may be mounted in any suitable way adjacent the valve, and in the form shown is carried by a frame 10, substantially rectangular in cross section, seated on the valve bonnet 7 and secured thereto by means of a lock nut 11. In the other end of the frame 10, which is preferably circular to form a supporting plate, are threaded a pair of bolts 12, 12, which bolts are surrounded by spacers 13, 13, 14, 14 and extend through suitable openings in a substantially annular frame 15 held in place against the spacers 14 by means of nuts 16 on the bolts 12, 12. Suitably mounted on the frame 15, as by means of a spider 17, is a corrugated expansible and collapsible vessel 18, rigidly supported at one end 19 by the spider 17 and carrying at its other end a movable head 20.

As the vessel 18 expands or contracts under the influence of variations in temperature, the head 20 is advanced or retracted, and this movement of the latter is imparted to a rod 21 threaded at one end in an annular member 22 resting against the head 20, and pinned to said member 22 by means of pin 23. Rod 21 is operatively connected to valve stem 6 through an adjustable connection hereinafter described, and to this end is slidable in a guide tube 24, the latter extending through one end of the frame 10 and having on its end a suitable handle or handwheel 25 secured thereto in any suitable manner. Preferably, a thrust collar 26 is secured to said tube 24 in any suitable manner, as by soldering. The tube 24 may be rotated in the frame 10 by means of the handwheel 25, but is normally held stationary by friction.

Suitable resilient means are provided for opposing expansion of the vessel 18, and these means in the form shown comprise a coil spring 27 seated at one end against the member 22 and head 20 of the vessel 18, and at the other end against a spring plate 28 threaded on the guide tube 24. The spring plate 28 may be adjusted to adjust the tension of spring 27 by rotating the handwheel 25 and tube 24, said plate being prevented from turning by means of guides 29 threaded in one end of the frame 10 and engaging notches 30 in the periphery of the spring plate 28. The adjustment of spring 27 provides a means for adjusting the thermostatic control to maintain a certain desired temperature, according to the well known operation of such devices. When, as explained briefly above, the valve stem is shortened, the thermostatic vessel will be required to expand farther in order to move the valve in again towards closed position until a condition of equilibrium is again reached. As before, the temperature at which such condition will be reached will depend principally upon the tension of the opposing spring which increases correspondingly as the thermostat continues to expand and the spring is compressed. In most cases, however, the total range of movement of the thermostat with relation to the length of the spring is so small that the spring tension remains substantially constant. In such a case, it is desirable to provide additional resilience, preferably by means of an additional spring, which comes into action only when the thermostat has advanced beyond its normal range of movement with the valve stem in its original condition of adjustment. In the form shown, the coil spring 31 is employed for this purpose. One end of the spring 31 is seated in the spring cup 32, which cup is movable to allow for compression of the spring 31 but which in the drawings is shown in its outermost position wherein it is retained to prevent expansion of the spring 31 by means of the flange or lip 33 engaging the frame member 15. The other end of the spring 31 is seated in an adjustable spring cup 34 which is threaded in a ring 35 mounted on the bolts 12 between the spacers 13 and 14. Spanner holes 36 may be provided in the spring cup 34 for purposes of adjustment. It will be seen that after the thermostatic vessel 18 has expanded sufficiently for the head 20 to engage the spring cup 32, further expansion thereof will be opposed by the combined action of springs 27 and 31.

While any suitable type of adjustable connection may be employed for connecting the valve stem 6 with the rod 21, a cam device is preferably employed for this purpose, provided with an operating handle whereby the adjustable connection may be selectively set in any desired position. One form of such a cam connection is shown in Figs. 1 to 4, inclusive. Referring particularly to Figs. 2 and 4, a connecting member 37 is threaded on the end of the valve stem 6 and held thereon by means of a lock nut 38, and said member 37 carries a projecting rod 39 which slides in a recess 40 in the end of the rod 21. A take-up spring 41 may be provided in said recess 40 if desired. A groove or slot 42 is provided in said member 37, in which slot engages a roller or cam 43. A bracket 44 is preferably threaded on the end of rod 21 and prevented from turning thereon by suitable means such as an arm 45 having a forked end 46 which engages a rod 47 rigidly secured to the frame 10. The arm 45 acts as a frictionless guide, being preferably flexible so that it will either slide on the rod 47 or will yield by flexure if it hangs on rod 47 instead of sliding. The bracket 44 provides a bearing for a short shaft 48 carrying a crank 49 which engages the roller 43. Pinned to the end of the shaft 48 is an arm 50, in the outer end of which a roller 51 is pivotally mounted by means of a pivot pin 52. The roller 52 engages in a fork 53 which is pinned at 54 to one end of a shaft 55 rotatable in a bearing 56 preferably threaded in the frame 10. The outer end of the shaft 55 is provided with a suitable handle 57, secured thereto as by means of a pin 58, and said handle 57 is preferably adapted to serve as an indicator or pointer. For this purpose, in the embodiment described, the handle 57 is provided at one end with the legend "night", and with this end of the handle uppermost the thermostatic control is set for night operation.

The regulator herein described may likewise be equipped to operate an electric switch when desired. For example, the heating system to which it is applied may include an electric circulating fan. In case the temperature increases to such a point that the valve 2 is substantially closed, the circulating fan would normally circulate cold air throughout the house, and to prevent this the circuit of the fan motor may be arranged to be automatically opened when the fuel control valve 2 is closed. Furthermore, when the valve 2 is almost closed, it may be desirable to cut off entirely the flow of fuel in pipe 1 by means of a suitable magnetically operated valve to prevent back-firing. While any suitable type of electric switch may be employed for such purposes, it is preferable to use a switch of the mercury contact type. In the form shown, a substantially U-shaped bracket 49 is rigidly secured to one side of the frame 10, as by means of the screws 60, and between the legs of the U is a pivotally mounted second U-shaped bracket 61 on a pivot pin 62. One of the legs of bracket 61 is extended and carries two transverse arms 63 and 64. To the outermost of these arms 64 is rigidly secured by means of bolts 65 a spring clip 66, in which is carried the glass shell 67 of the switch, containing the two contacts 68 and a quantity of conductive liquid such as mercury. On one end of the other arm 63 is carried a weight 69 which normally tends to rotate the bracket 61 so that the switch 67 occupies a substantially horizontal position and the contacts 68 are open. The switch, however, is normally maintained in the inclined position shown in the drawings wherein the contacts 68 are closed by means of an arm 70 carrying a weight 71 and engaging the other end of the arm 63. The arm 70 is preferably integral with a plate 72, which plate is pivotally mounted by means of ears 73 on a pivot pin 74 carried in the arms of a U-shaped bracket 75 which is suitably secured to the frame 10, as by means of the screws 76. The arm 70 and weight 71 are lifted from engagement with the arm 63 as the valve 2 reaches its closed position by means of a pin 77 arranged to engage the plate 72. The pin 77 is preferably carried by an arm 78 formed on the connecting member 37, and is adjustable in said arm 78, being secured in adjusted position by a lock nut 79. The contacts 68 are connected by leads 80 to a terminal block 81, from which leads 82 extend through an opening 83 in the frame 10 to the desired point. The switch mechanism and adjustable connections between the thermostat and valve are preferably enclosed by means of side plates 84 secured to the frame 10 by means of the screws 85.

The operation is as follows:—Assume the valve body 5 installed in the fuel control line, the thermostat 18 subjected to the temperature of the house (preferably by inserting the thermostat in the return air duct of the heating system), the springs 27 and 31 properly adjusted for the desired night and day temperatures, respectively, and the thermostat set for night operation by means of the handle 57, this condition being shown in the drawings. Under these conditions, as the temperature of the return air varies, the thermostat 18 will expand or contract and through the adjustable connection will advance or retract the valve 2, thereby decreasing or increasing the supply of fuel to compensate for the change of temperature and to maintain a substantially constant temperature of say 60° F. depending on the adjustment of spring 27. The principles and operation of such a thermostatic control are well known in the art and require no further explanation.

When it is desired to set the thermostat for day operation, it is only necessary to turn the handle 57 through 180°. This will rotate shaft 55 through 180° which, acting through fork 53, roller 52, arm 50, shaft 48, crank 49, and cam roller 43, will shift the member 37 toward the thermostatic vessel 18, shortening the connection between said thermostat and the valve and retracting the valve. An increased flow of fuel will immediately result, and as the house begins to warm up, the thermostat 18 will continue to expand further until the head 20 engages the spring cup 32 and the spring 31 acts on the thermostat. The latter is now subject to the combined action of springs 27 and 31, and as before stated, spring 31 has been so adjusted that a new constant temperature of say 70° F. will be maintained. If, during either day or night operation, the amount of fuel required is so small that the valve 2 is practically closed, pin 77 will engage plate 72 and lift arm 70 from engagement with arm 63. Weight 69 will now rotate the switch device to a substantially horizontal position wherein the contacts 68 are open. The adjustment of pin 77 in arm 78 is not critical because of the employment of a piston valve 2 so that the valve may overrun its closed position. Obviously, the switch device may be employed to control any electric circuit, and its operation may be reversed by reversing the position of the shell 67 in the clip 66.

Figs. 5, 6 and 8 show a somewhat modified form of thermostatic control device designed for the same service as the device shown in Figs. 1 to 4, inclusive, and differing therefrom principally in the arrangement of the switch mechanism and of the adjustable connections between the valve stem and the thermostat. The arrangement of the valve assembly and thermostatic control, together with the supporting means therefor, is substantially the same as heretofore described, except that the integral frame 10 is replaced by an assembly comprising a circular supporting plate 90, and a plate or arm 91 supported on the valve bonnet, said plates being rigidly connected by bolts 92 carrying spacers 93. The thermostat 18, the two springs 27 and 31, together with their adjusting means, and the rod 21, are carried from the plate 90, all substantially as described in connection with the embodiment shown in Figs. 1 to 4. The rod 21 and the valve stem 6, however, are connected in this embodiment through a cam device including a wedge-shaped member which may be displaced transversely of the line of connection between said elements in order to lengthen or shorten the connection. Referring now to the drawings, the end of the rod 21 is threaded to receive a substantially rectangular block 94, and the end of the valve stem 6 is threaded to receive a similar substantially rectangular block 95 held in place by a nut 96. The opposed faces of said blocks 94 and 95 are provided with parallel grooves or slots 97, 97, in which slides a wedge-shaped member 98. Mounted on the rod 21 and the valve stem 6, on either side of the blocks 94 and 95, are a pair of cross arms 99, 99, and between the opposite ends of these cross arms are a pair of tensioned coil springs 100, 100. In the position shown in the drawings, the connection has its greatest length, but when the wedge member 98 is displaced so that its narrower end engages in the slot 97, springs 100 draw the blocks 94 and 95 closer together and thereby shorten the connection.

As in the embodiment first described, the control device may be equipped with an electric switch which is operated when the valve 2 is closed. Preferably, a mercury contact switch is employed for this purpose, which in the present instance is shown mounted with the thermostatic control device in a horizontal position. The switch mechanism is preferably mounted on the plate or arm 91, in any suitable way, and as shown a lug or post 101 is secured to the arm 91 by means of screws 102 for this purpose. A bracket 103, having substantially the shape of an inverted channel, is suitably secured to the lug 101 as by means of screws 104. A large opening 105 is formed in the top surface of the bracket or shelf 103, and formed integrally with said bracket at either side of said opening are a pair of ears or lugs 106. Pivoted between said ears 106 at 107 is a substantially U-shaped bracket 108, which bracket carries spring clips 109 holding the shell of a mercury contact switch of any suitable type.

Any suitable means may be employed for swinging the bracket 108 about its pivot 107 and thereby opening the switch when the valve 2 approaches or reaches its closed position, as described before. Preferably, and as shown, depending arms 110 are pivoted at 111 to each of the legs of the bracket 108, and links 112 are pivoted at one end at 113 to each of the arms 110 and at the other end at 114 to the sides of the channel-shaped bracket 103. Said links 112 are joined intermediate their ends by a cross piece 115, and a screw or bolt 116 passing loosely through the cross piece 115 and the bracket 103 limits the downward swing of the links 112 about pivots 114. The cross piece 115 is provided with a depending lug 117 through which passes loosely a bolt 118, and a coil spring 119 is interposed between the lug 117 and the head of the bolt 118. The block 95 secured to valve stem 6 is provided with an upstanding arm 120, suitably secured thereto as by means of screws 121, and an adjustable contact 122 is threaded in the upper end of arm 120 and held in place by a set screw 123.

The operation of the thermostatic control device as respects day and night operation is substantially the same as heretofore described in connection with the embodiment of Figs. 1 to 4, the adjustment for the two conditions being made by shifting the wedge 98. In case valve 2 is substantially closed during either condition of operation, the contact 122 strikes the head of bolt 118, compressing the spring 119. As soon as the tension of spring 119 becomes sufficiently large to overcome the weight of the switch and associated moving parts, the links 112 will be swung up around their pivots 114, thereby similarly swinging the bracket 108 about its pivot 107 and tilting the shell of the switch so that the contacts are opened. When the valve is again retracted, the switch moves back to closed position by gravity.

Fig. 7 shows a further embodiment of the invention, wherein the valve arrangement, adjustable connections between valve and thermostat, and switch assembly are the same as shown in Figs. 5, 6 and 8. In Fig. 7 two thermostats are employed, which come into action successively under different adjustments of the valve stem, as well as two opposing springs. This may be accomplished by employing one thermostat having a limited range of expansion for lower temperatures, and a second thermostat which is inoperative throughout the initial range of expansion of the first thermostat but comes into action when the first thermostat has reached its maximum expansion. Preferably, the two thermostats are connected rigidly end to end, the common head being movable, the outer end of one thermostat being rigidly mounted and the outer end of the other being connected to the valve stem to be operated. Such a structure is shown in Fig. 7, wherein the thermostatic elements are supported from a plate 130, the latter being operatively mounted in any suitable manner such as that shown and described in connection with the plate 90 of Figs. 5 and 6. Passing through the plate 130 are a plurality of bolts 131, on which are placed a suitable number of spacers 132, 133, 134, these elements being rigidly secured to one another by nuts 135 on the bolts 131.

Between the spacers 134 and nuts 135 is rigidly held a ring 136 to which is rigidly secured as by screws 137 a thermostat spider 138. The spider 138 carries a thermostatic vessel comprising the head 139 rigidly secured to said spider, the corrugated wall 140, and the movable head 141 resting against or suitably secured to the plate 142. A second thermostat comprises an end wall 143 resting against or secured to said plate in any suitable way, a corrugated wall 144 and a movable end wall or head 145, preferably of the cup type. The thermostats need not be secured to plate 142 since they will expand against it and hold themselves in place. To the end wall 145 is secured a member 146 having an annular extension in which is threaded and pinned a rod 147 such as heretofore described for connecting the thermostat with the valve to be operated thereby, said rod extending through a guide tube 148 passing through the plate 130. Movement of said head 145 and rod 147 is normally opposed by a coil spring 149 bearing at one end against the member 145 and at the other end against a spring plate 150 threaded on the guide tube 148 and locked against turning by posts 151. The maximum movement of the end wall 145 is limited with respect to the end wall 143 by means of a ring 152 held rigidly at a fixed distance from the plate 142 by means of the bolts 153 and nuts 154. The assembly comprising the plate 142, thermostat 144 and movable head 145, and the ring 152, is movable as a whole under the action of the first thermostat 140, and this movement is resiliently opposed by the coil spring 155 bearing at one end against the plate 142 and seated at its other end in a spring cup 156 threaded in a ring 157 securely held between the spacers 132 and 133 on the bolts 131. The spring cup 156 may be provided with spanner openings 158 for purposes of adjustment. The maximum expansion of the first thermostat 140 may be limited if desired by means such as a ring 159 held between spacers 133 and 134 on the bolts 131 and engaging the plate 142.

The operation is as follows. With the wedge 98 in the position shown for night operation, the plate 142 is held stationary by the heavy spring 155, and constitutes a fixed head for the thermostat 144 and its movable wall 145. The latter, operating against the spring 149, controls the valve 2 so as to maintain a constant temperature determined by the adjustment of spring 149. When the wedge 98 is shifted into position for day operation, the temperature increases to such a point that the movable wall 145 rigidly engages the ring 152, so that for day operation the plate 142 is in effect rigidly connected with the rod 147. At these temperatures, therefore, the plate 142 acts as the movable head of the thermostat 140, operating against the springs 155 and 149, and maintaining a constant steady temperature determined by the adjustment of said springs under either condition, the operation of the switch mechanism is the same as heretofore described in connection with Figs. 5 and 6.

The above examples illustrate the application of the invention to heating systems wherein it is desired to maintain either one of two constant temperatures. It will be observed that the invention enables the user, by the simple expedient of manipulating an indicator or handle, to selectively set the apparatus to different operating conditions. Stated another way, the invention enables the user to selectively vary the relative positions of the controlling element and the controlled member. Thus the apparatus may, if desired, be adapted to produce the same accurate regulation under selectively different controlling conditions, as in the examples given. On the other hand, it may be adapted to produce different results under the same controlling condition as would be the case, for example, if the valve 2 in the examples given controlled the flow of a fluid in accordance with a temperature unaffected by said flow. In such a case obviously the thermostat would be unaffected by adjustments, but the action of valve 2 in pipe 1 would be selectively different. To illustrate further, it will be observed that in the examples given the electric switch may be selectively operated at either 60° F. or 70° F., and vice versa, and if two switches were provided, one at each position of the valve stem for a given temperature (say 60° F.), either switch could be selectively operated at said temperature. Moreover, it will be apparent that the invention is not limited to devices having only two conditions of adjustment as in the examples given, but can be readily adapted by carrying out the above principles in a manner obvious to those skilled in the art to have several conditions of adjustment or several changes of position of the controlled member, etc., in any desired number.

These features of selectivity in operation are of great importance in practice, because of the many instances in which two or more service conditions are encountered. In such instances, the present invention provides an extremely simple and convenient and yet entirely effective means for selectively adapting the apparatus to the particular conditions met. The adjustment is not one of installation, but one which may be made in an instant by any person, however ignorant or skilled in the management and operation of the apparatus, and it may be changed as often and at as short intervals as may be desired. Moreover, the apparatus is simple, involving only comparatively slight and inexpensive modifications of existing types of control, and may therefore be manufactured in quantities at relatively little more cost than apparatus of this character heretofore known. It will also be observed that the adjustments made by operating the handle 57 or wedge 98 require only sufficient effort to overcome the friction of the related parts. This friction may be very slight so that very little effort is required, as opposed to the usual method of adjusting such devices which requires the adjustment of comparatively heavy springs. It will therefore be seen that the invention makes possible the use of time controlled devices such as clocks and the like for adjusting devices of the character which have heretofore been beyond the capabilities of such apparatus.

Obviously, the invention is not limited to the particular use described in the above examples, but may be widely employed in various arts for various purposes other than thermostatic control of house heating. Likewise it will be understood that there is no essential relation between the invention and thermostatic control, but it may be used as well with pressure control or any other similar or analogous type of regulation, whether of valves, switches, or other controlled members, and the term "pressure responsive element" in the appended claims is therefore to be read as including any such control device. Furthermore, while several mechanical embodiments of the invention have been illustrated and described, it is to be expressly understood that the invention is not limited thereto but is capable of a wide variety of mechanical expressions, some of which will now readily occur to this skilled in the art. Similarly, changes may be made in the form, details and arrangement of the parts in the illustrations given without departing from the spirit of the invention. Reference is therefore to be had to the appended claims for a definition of the limits of the invention.

What is claimed is:

1. Apparatus of the class described comprising the combination of pressure responsive means, a member controlled thereby, connections between said means and member means for selectively controlling said connections to vary the position of said member for a given position of said means, and resilient means for controlling the action of said pressure responsive means and operable to exert differing magnitudes of resilient force in different conditions of said controlling means.

2. Apparatus of the class described comprising a pressure responsive element, a member controlled thereby, and means operatively connecting said elements and said member, said means including a device for selectively adjusting said connecting means to vary the range of actuation of said member for a given position of said element, and resilient means for controlling the action of said pressure responsive element and having different ranges of resilient action for different conditions of adjustment of said device.

3. Apparatus of the class described comprising a pressure responsive element, resilient means normally opposing movement of said element. a member controlled by said element, and means operatively connecting said element and member, said means including a device for selectively adjusting the length of said connecting means and the magnitude of the resilient force opposing movement of said element to vary the actuation of said member for a given operation of said element.

4. Apparatus of the class described comprising a pressure responsive element, a plurality of resilient means for controlling the action of said element, a member controlled by said element, and means operatively connecting said element and said member including a device for adjusting said connecting means to selectively vary the position of said member for a given position of said element, said resilient means being arranged to exert different magnitudes of resilient force in successive positions of movement of said pressure responsive element.

5. Apparatus of the class described comprising a pressure responsive element, a member to be actuated thereby, a spring normally opposing movement of said element, a second spring opposing movement of said element during a portion only of said movement, means connecting said element with said member, and means for adjusting said connecting means whereby one or both of said springs oppose the movement of said element during the effective movement of said member.

6. Apparatus of the class described comprising a pressure responsive element, a member to be actuated thereby, a spring normally opposing movement of said element, a second spring opposing movement of said element during a portion only of said movement, means operatively connecting said element with said member, and a cam forming part of said connecting means and varying the length of said connecting means to determine whether one or both of said springs shall oppose the movement of said element during the effective movement of said member.

7. Apparatus of the class described comprising a pressure responsive element resilient means cooperating therewith, a member controlled thereby, means operatively connecting said element and member including a manually operable device for selectively adjusting said connecting means and the cooperation of said resilient means with said element to vary the position of said member for a given position of said element, a second member, and means for actuating said second member in a predetermined position of said first member regardless of the adjustment of said connecting means.

8. Apparatus of the class described comprising the combination of a pressure responsive element, a member controlled thereby, and means including selectively operable resilient means for selectively controlling the range of operation of said element which produces a predetermined range of operation of said member.

9. Apparatus of the class described comprising the combination of a pressure responsive element, a member controlled thereby, means operatively connecting said element and member, said means being selectively adjustable to vary the range of operation of said element which produces a predetermined operation of said member, and resilient means cooperating with said element and having selectively variable action thereon dependent on the adjustment of said connecting means.

10. Apparatus of the class described comprising in combination a pair of pressure responsive elements having a common movable wall, a member controlled by said elements, means connecting said member with one of said elements, resilient means normally opposing movement of said one element, and resilient means operable after a predetermined extent of movement of said one element for controlling the movement of the other element.

11. Apparatus of the class described comprising in combination a pair of expansible elements having a common movable wall, a member to be controlled by said elements, means connecting said member with one of said elements, means for limiting the expansion of said one element, resilient means normally opposing movement of said one element, and resilient means normally opposing movement of said movable wall.

12. Apparatus of the class described including in combination a pressure responsive element, resilient means normally opposing movement thereof, means to be controlled, connecting means between said last named means and said element, a second resilient means adapted to be engaged by said element after a predetermined movement thereof and thereafter oppose movement of said element, and means for predetermining whether or not said element shall engage said second resilient means.

13. Apparatus of the class described including in combination a pressure responsive element, resilient means normally opposing movement thereof, means to be controlled, connecting means between said last named means and said element, other resilient means for opposing movement of said element, and means in said connecting means for predetermining whether or not said element shall engage said other resilient means.

14. Apparatus of the class described including in combination a pressure responsive device comprising two expansible and contractible elements having a common wall, resilient means normally holding said wall stationary, means to be controlled, connecting means between said last named means and said device, resilient means normally opposing movement of said connecting means, and means for predetermining whether or not said first named resilient means shall aid in opposing movement of said means to be controlled.

In testimony whereof I have signed this specification.

WILLIAM W. CARSON, Jr.